(12) United States Patent
Atsuumi et al.

(10) Patent No.: US 6,791,729 B2
(45) Date of Patent: Sep. 14, 2004

(54) ADJUSTING IMAGING POSITION OF OPTICAL BEAM SPOT IN MAIN AND SUB-SCANNING DIRECTIONS BY INDIVIDUALLY AND/OR COLLECTIVELY ADJUSTING POSITION(S) OF TEMPERATURE-COMPENSATING LENS(ES)

(75) Inventors: Hiromichi Atsuumi, Kanagawa (JP); Seizo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 10/161,756

(22) Filed: Jun. 5, 2002

(65) Prior Publication Data

US 2002/0196514 A1 Dec. 26, 2002

(30) Foreign Application Priority Data

Jun. 5, 2001 (JP) ........................................ 2001-169357

(51) Int. Cl.[7] .............................................. G02B 26/08
(52) U.S. Cl. ........................ 359/210; 359/209; 347/259
(58) Field of Search ............................... 359/212, 209, 359/197, 210, 218; 347/258, 259, 261

(56) References Cited

U.S. PATENT DOCUMENTS

| | | | |
|---|---|---|---|
| 5,561,743 A | * 10/1996 | Kanai et al. | ............. 347/261 |
| 5,875,051 A | 2/1999 | Suzuki et al. | |
| 5,986,791 A | 11/1999 | Suzuki et al. | |
| 6,069,724 A | 5/2000 | Hayashi et al. | |
| 6,078,419 A | 6/2000 | Atsuumi | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,198,563 B1 | 3/2001 | Atsuumi | |
| 6,222,662 B1 | 4/2001 | Suzuki et al. | |
| 6,233,081 B1 | 5/2001 | Suzuki et al. | |
| 6,256,133 B1 | 7/2001 | Suzuki et al. | |
| 6,347,004 B1 | 2/2002 | Suzuki et al. | |
| 6,376,837 B1 | 4/2002 | Itabashi et al. | |
| 6,381,057 B1 | 4/2002 | Itabashi | |
| 6,384,949 B1 | 5/2002 | Suzuki et al. | |
| 6,388,792 B1 | 5/2002 | Atsuumi et al. | |
| 6,429,956 B2 | 8/2002 | Itabashi | |
| 6,469,772 B1 | 10/2002 | Itabashi | |
| 6,498,617 B1 | 12/2002 | Ishida et al. | |

OTHER PUBLICATIONS

Pub. No.: US 2002/0101642; Appl. No. 10/058,446: Filed: Jan. 28, 2002; Inventor: Masuda.

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

The imaging position of an optical beam spot in an optical scanning device is adjusted. The imaging position of the optical beam spot is adjusted in both a main scanning direction and a sub-scanning direction. The imaging position of the optical beam spot in the main scanning direction is adjusted by individually adjusting, in an optical axis direction, a position of at least one lens 10 having power in the main scanning direction. The imaging position of the optical beam spot in the sub-scanning direction is adjusted by collectively adjusting, in the optical axis direction, a position of the linear image imaging optical system 100 as a whole.

21 Claims, 4 Drawing Sheets

------- : MAIN SCANNING DIRECTION
——— : SUB-SCANNING DIRECTION
WRITING WIDTH : ±161.5 mm

ADJUSTING IMAGING POSITION OF OPTICAL BEAM SPOT IN MAIN AND SUB-SCANNING DIRECTIONS BY INDIVIDUALLY AND/OR COLLECTIVELY ADJUSTING POSITION(S) OF TEMPERATURE-COMPENSATING LENS(ES)

BACKGROUND OF THE INVENTION

1. Field of the Invention

The present invention relates to a method and device for forming an image, and more particularly to a method and device that can effectively adjust an imaging position of an optical beam spot formed on a scanned surface.

2. Discussion of the Background

An optical scanning device is commonly known in relation to an image forming apparatus such as a digital copier, a laser printer, a facsimile, an optical plate-maker, an optical plotter, and other similar devices. Recently, recording density in digital copiers and laser printers has been increasing, and an optical beam spot having a smaller diameter is formed on a surface of a photoconductive medium. In addition, it has become common to use a resin lens in a scanning imaging optical system (i.e., an optical system in which a deflected light flux forms an image on the surface of the photoconductive medium) from view point of cost and ease of forming a lens surface into a special shape.

In order to form an optical beam spot having an appropriate diameter on the surface of the photoconductive medium, the optical beam spot needs to be precisely formed. Thus, an adjustment of an imaging position of the optical beam spot is required. The optical beam spot is precisely formed on the surface of the photoconductive medium when each optical element is accurately located as designed in an optical path formed from a light source to the photoconductive medium. However, when errors caused in processing or assembling the optical elements are considered, it may not be practical to arrange the optical elements as designed.

Degrees of variance of a radius of curvature and refractive index of a resin lens caused by change in environmental temperature is large compared to those of a glass lens. Thus, if the environmental temperature changes, a change in a shape and variance of refractive index of the resin lens are caused, and the imaging position of the optical beam is then shifted from the surface of the photoconductive medium. Hence, the diameter of the optical beam spot is increased, resulting in degradation of a produced image due to lowered resolution.

In an optical scanning device, an optical system provided between the light source and photoconductive medium generally includes an anamorphic optical system. In the anamorphic optical system, an image in the main scanning direction is differently formed from the image formed in the sub-scanning direction. Thus, the diameter of the optical beam spot is differently increased between the main and sub-scanning directions when a resin lens is used.

A method of correcting a shift of an imaging position of an optical beam spot caused by change in an environmental temperature is disclosed in Japanese Patent Laid-Open Publication No. 8-292388. In the method, the imaging position of the optical beam spot is oppositely shifted in positive and negative lenses, respectively. A resin lens having a power that is opposite to a power of a resin lens in a scanning imaging optical system is provided in an optical path formed from a light source to an optical deflector to offset the shift of the imaging position of the optical beam spot.

Another method is disclosed in Japanese Patent Publication No. 2804647: either a positive or negative resin lens, which is opposite to but has a same power as a resin lens in the scanning imaging optical system, is provided between a light source and optical deflector so as to correct a shift of the imaging position of the optical beam spot on the surface of the photoconductive medium in the main scanning direction. In addition, a location of the scanning imaging optical system is regulated to a level in which a degree of the shift of the position of the optical beam spot in the sub-scanning direction is negligible.

SUMMARY OF THE INVENTION

The present invention has been made in view of the above-mentioned and other problems, and addresses the above-discussed and other problems.

The present invention advantageously provides a novel method of adjusting an imaging position of an optical beam spot in both main and sub-scanning directions in an optical scanning device.

According to an exemplary embodiment of the present invention, the method includes an adjustment of the imaging position of the optical beam spot in the main scanning direction by adjusting a position of at least one lens having a power in the main scanning direction in an optical axis direction, and an adjustment of the imaging position of the optical beam spot in the sub-scanning direction by collectively adjusting a position of a linear image imaging optical system as a whole in the optical axis direction.

The present invention further advantageously provides an optical scanning device in which a shift of the imaging position of the optical beam spot caused by change in environmental temperature due to use of a resin imaging element is properly corrected.

Other objects, features and advantages of the invention will become apparent to those skilled in the art when reading the following Detailed Description with reference to the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which like reference numerals refer to like or corresponding elements throughout, and in which.

DETAILED DESCRIPTION OF THE PREFERRED EMBODIMENTS

Figure 1A:
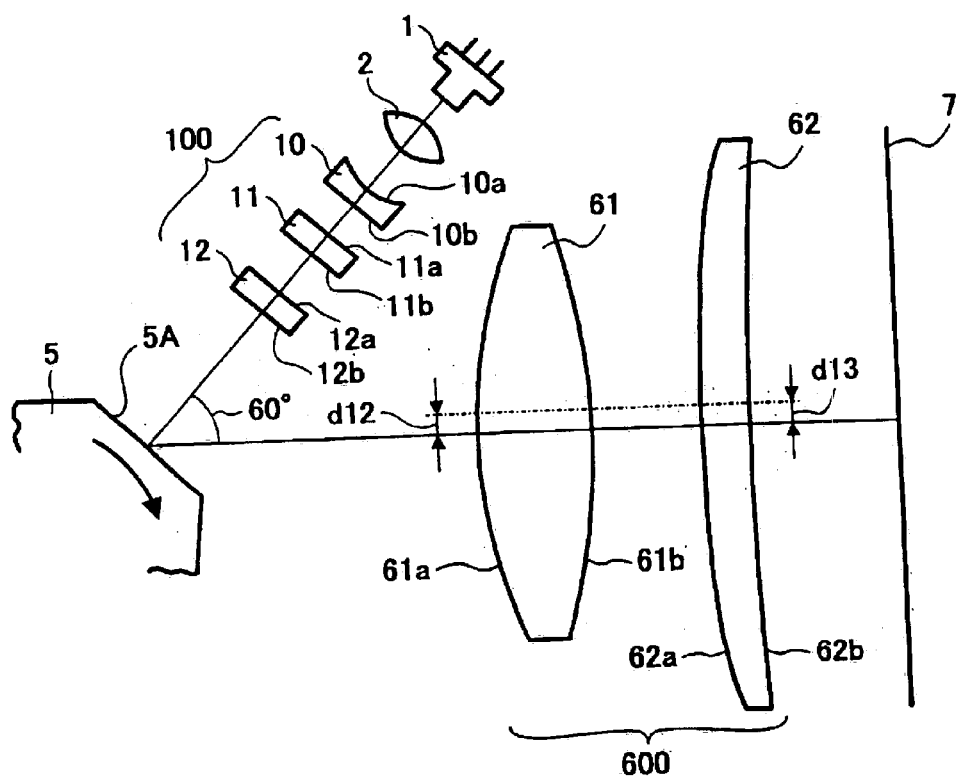
FIGS. 1A and 1B are drawings illustrating a construction of an optical scanning device according to an example of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Moreover, features and procedures whose implementations are well known to those skilled in the art are omitted for brevity.

Figure 1B:
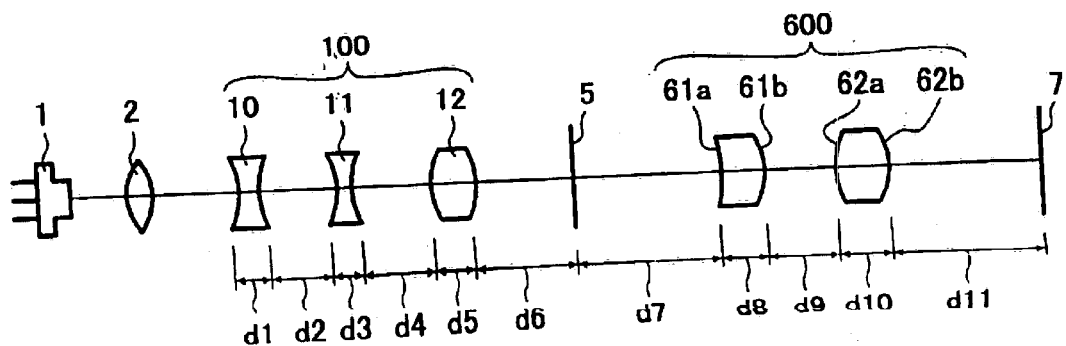

Referring now to the drawings, in which like reference numerals designate identical or corresponding parts throughout the several views, FIG. 1A is a drawing illustrating an optical configuration viewed from a sub-scanning direction. FIG. 1B is a drawing illustrating an optical path formed from a light source to a scanned surface in a line. A vertical direction in FIG. 1B corresponds to the sub-scanning direction.

In FIGS. 1A and 1B, light flux emitted from a light source 1 is converted to a desired type of light flux (i.e., a parallel light flux, weak diverging light flux, or weak converging light flux) by a coupling lens 2. In an example of the present invention, the light flux is coupled to a substantially parallel light flux as the coupling lens 2 collimates the light flux.

In an example of the present invention, a single beam system using a single semiconductor laser is adopted as the light source 1. However, a multi-beam system may be adopted: light flux emitted from a semiconductor laser array or a plurality of semiconductor lasers is synthesized by a beam synthesis prism.

Coupling lens 2 is formed of a single aspherical lens, and wavefront aberration is appropriately corrected. Thus, parallel light flux is emitted by the coupling lens 2 because wavefront aberration is corrected.

The light flux passed through coupling lens 2 reaches a linear image imaging optical system 100. The illustrated linear image imaging optical system 100 includes resin lenses 10 and 11, and a glass lens 12.

As used in this specification, "power" is used in the conventional sense, and denotes the ability of an optical element to change the direction of incoming light, for example, through refraction. Negative power may denote the ability to diverge incoming light (such as by a concave surface), and positive power may denote the ability to converge incoming light (such as by a convex surface). Power is determined independently along different axes. Power relates generally to the concept of magnification (increasing the apparent size of an object using one or more optical elements), but here optical elements of specially chosen powers are used to adjust the imaging position of a beam spot.

An incident surface 10a of the resin lens 10 is formed into a spherical shape having a negative power. The incident surface 10a may be formed into a cylindrical shape having a negative power only in a main scanning direction. An emerging surface 10b is formed into a cylindrical shape having a negative power only in a sub-scanning direction. Thus, resin lens 10 has negative power in both the main and sub-scanning directions; however, the negative power in the sub-direction is larger than that in the main scanning direction.

Light flux passes through the resin lens 10 reaches the resin lens 11. Resin lens 11 has a negative power only in the sub-scanning direction. Both incident and emerging surfaces of the resin lens 11 are formed into a concave cylindrical shape. The light flux passed through the resin lens 11 reaches glass lens 12.

Glass lens 12 may be toroidal lens having a positive power in both main and sub-scanning directions. Glass lens 12 provides substantially parallel light flux in the main scanning direction and converging light flux in the sub-scanning direction. The light flux from glass lens 12 forms a long linear image in the main scanning direction in the vicinity of a deflecting surface of an optical deflector 5.

Glass lens 12 may be formed as a toroidal lens. However, glass lens 12 may be integrally formed such that one surface thereof is shaped into a convex cylindrical surface having a positive power in the sub-scanning direction and the other surface is shaped into a convex spherical surface. Alternatively, glass lens 12 may be formed of a cylindrical lens and spherical lens glued together. In addition, glass lens 12 may be formed as combination of a cylindrical surface having a large positive power and a cylindrical surface having a relatively small positive power.

Glass lens 12 may be formed into a cylindrical lens having a positive power only in the sub-scanning direction if light flux coupled by coupling lens 2 is weak converging light flux having a large light flux diameter, and the light flux passed through resin lens 10 is made to be parallel to the main scanning direction.

Optical deflector 5 is formed of a rotatable polygon mirror. Optical deflector 5 deflects light flux at an equiangular velocity while rotating at a constant speed. The deflected light flux passes through a scanning imaging optical system including lenses 61 and 62. The light flux passed by lenses 61 and 62 condenses toward a scanned surface 7 to form an optical beam spot on the scanned surface 7.

Optical scanning of the scanned surface 7 is performed by the optical beam spot. The scanned surface 7 may be, for example, a photoconductive surface of a photoconductive medium. The scanning imaging optical system includes a function of an fθ lens to move the optical beam spot with constant velocity.

Lenses 61 and 62 are formed of resin. Both lenses 61 and 62 have a power in both main and sub-scanning directions. The position of the optical beam spot on the scanned surface shifts in both main and sub-scanning directions if the shape and refractive index of the lenses change due to a change in environmental temperature. The shift in the main scanning direction is corrected by a variance of the power of the incident surface 10a of resin lens 10 in the main scanning direction. The shift in the sub-scanning direction is corrected by a variance of the powers of the emerging surface 10b of the resin lens 10, an incident surface 11a and emerging surface 11b of the resin lens 11.

Adjustment of imaging position of an optical beam spot is described below.

The optical system of the optical scanning device is assembled. Light source 1, coupling lens 2, scanning imaging optical system 61, 62, are then fixed after aligning them in the right place. Rough positioning of the linear image imaging optical system 100 is performed. Thus, the adjustment of the imaging position of the optical beam spot on the scanned surface is performed.

Figure 2A:
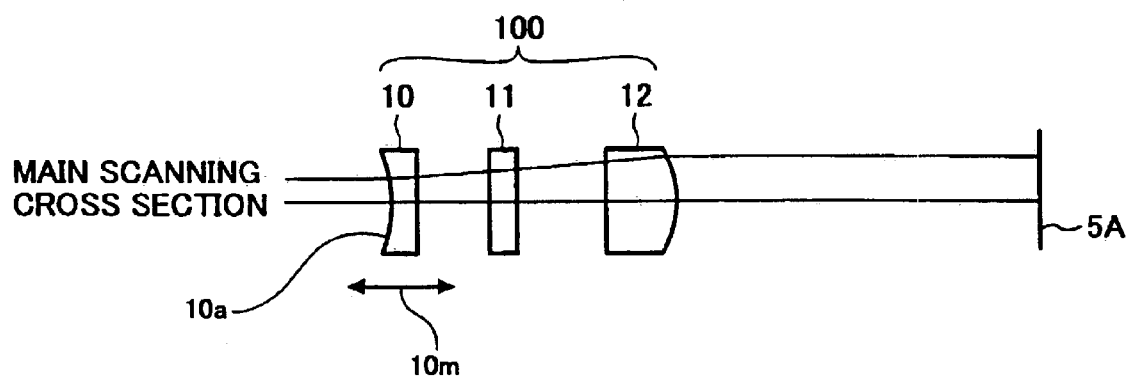
FIGS. 2A and 2B are drawings illustrating an operation of an exemplary linear image imaging optical system 100 (FIGS. 1A, 1B)
Figure 2B:
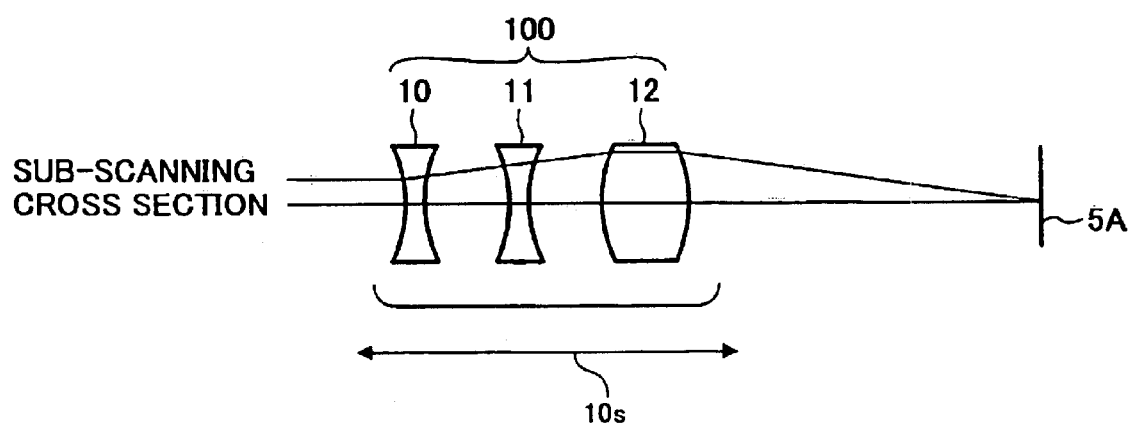

FIGS. 2A and 2B illustrate operation of the exemplary linear image imaging optical system 100 of FIGS. 1A, 1B.

FIG. 2A illustrates a cross section of the linear image imaging optical system 100 in the main scanning direction (i.e., a virtual sectional view of the linear image imaging optical system in parallel with the main scanning direction). FIG. 2B illustrates a cross section of the linear image imaging optical system in the sub-scanning direction (i.e., a virtual sectional view of the linear image imaging optical system in parallel with the sub-scanning direction). Coupled parallel light flux is emitted from a light source side that is located to the left of FIGS. 2A and 2B.

Resin lens 11 and glass lens 12 are retained by a first holder (not shown). A position of the first holder is adjustable in an optical axis direction of the linear image imaging optical system.

Resin lens 10 is retained by a second holder (not shown) that is retained by the first holder. A position of the second holder with respect to the first holder is adjusted in the optical axis direction of the linear image imaging optical system.

In FIG. 2A, the incident parallel light flux is caused to diverge by the negative power of the incident surface 10a of the resin lens 10 in the main scanning direction. The light flux passes through resin lens 11, which does not have power in the main scanning direction, and reaches glass lens 12. The diverging tendency of the light flux is weakened by the positive power of glass lens 12 in the main scanning direction.

When resin lens 10 is moved in the optical axis direction in FIG. 2A (indicated by arrow 10m), the shape of the light flux that emerges from the glass lens 12 changes in the cross section in the main scanning direction. Thus, the form of the light flux emerging from glass lens 12 is changed by adjusting the position of resin lens 10 in the optical axis direction such that the light flux forms an image on the scanned surface 7 (FIGS. 1A, 1B) in the main scanning direction. The light flux thus becomes approximately parallel in cross section in the main scanning direction.

In this manner, linear image imaging optical system 100 serves as a beam expander in the cross section in the main scanning direction. Thus, light flux emerging from the linear image imaging optical system 100 reaches a deflecting surface 5A in the form of parallel light flux in the cross section in the main scanning direction. The light flux is then deflected.

The optical beam spot is correctly positioned on the scanned surface 7 (FIGS. 1A, 1B) in the main scanning direction by adjustment (FIG. 2A arrow 10m) of the position of the resin lens 10. Thus, adjustment of the imaging position of the optical beam spot in the main scanning direction is completed.

With this adjustment achieved, the position of the resin lens 10 in the linear image imaging optical system may be fixed. Namely, the second holder is fixed to the first holder. Thus, the resin lenses 10 and 11, and the glass lens 12, which form the linear image imaging optical system 100, become united. Then, these lenses are collectively moved (see FIG. 2B arrow 10s) in the optical axis direction by moving the first holder.

As illustrated in FIG. 2B, the negative power of the incident and emerging surfaces of resin lens 10 gives a diverging tendency to the parallel light flux incident from the light source side. The negative power of the incident and emerging surfaces of the resin lens 11 enhances the diverging tendency of the light flux. The light flux then reaches the glass lens 12 where the light flux is converted into converging light flux by the positive power of the glass lens 12 in the sub-scanning direction.

The linear image imaging optical system 100 is collectively moved in the optical axis direction (see arrow 10s) such that the light flux forms an image on the scanned surface 7 (FIGS. 1A, 1B) in the sub-scanning direction. Then, the first holder is fixed, thereby fixing the whole linear image imaging optical system 100.

When the position of the whole linear image imaging optical system is thus fixed, an optical beam spot correctly forms an image on the scanned surface 7 in the sub-scanning direction. Hence, the adjustment of the imaging position of the optical beam spot in the sub-scanning direction is completed.

The above-described adjustment is made to set an imaging position of an optical beam spot on the scanned surface 7 in both main and sub-scanning directions. Thus, the adjustment is made independently of a correction made to a shift of an imaging position of the optical beam spot caused by a change in an environmental temperature. Hence, the method of adjustment of the imaging position of the optical beam spot according to the present invention is applied when the linear image imaging optical system is formed of only a glass lens.

In the above-described example of the present invention, the adjustment of the imaging position of the optical beam spot in the main scanning direction is made by adjusting a position of the resin lens 10 that has a power in the main scanning direction. However, the adjustment in the main scanning direction may be made by adjusting a position of the glass lens 12 in the optical axis direction instead of adjusting the position of the resin lens 10 because the glass lens 12 also has power in the main scanning direction. In addition, the adjustment in the main scanning direction may be made by adjusting the positions of both glass lens 12 and resin lens 10 in the optical axis direction.

When the adjustment of the imaging position of the optical beam spot in the sub-scanning direction is made in the above-described example, the position of the optical beam spot does not substantially shift in the main scanning direction if the whole linear image imaging optical system is collectively moved in the optical axis direction, because the linear image imaging optical system is configured to be approximately an afocal system in the main scanning direction.

Even if the coupled light flux is not parallel light flux but a diverging or converging light flux, an image formed in the main scanning direction in the scanning imaging optical system 100 is scaled down, and thereby the image is scaled down in length when a diverging or converging tendency is weak. Thus, if the linear image imaging optical system 100 is configured to be approximately an afocal system in the main scanning direction when the adjustment of the imaging position of the optical beam spot in the main scanning direction is completed, the adjustment of the imaging position of the optical beam spot in the sub-scanning direction has substantially no effect on the adjusted imaging position of the optical beam spot in the main scanning direction.

In the above-described optical scanning device, a coupled light flux incident from the light source 1 side is formed into a long linear image in the main scanning direction by lenses 10, 11, and 12. Optical deflector 5, having deflecting surface 5A in the vicinity of a position where the linear image is formed, deflects the linear image. Lenses 61 and 62 condense the linear image toward the scanned surface 7 to form an optical beam spot on the scanned surface 7. The linear image imaging optical system 100 includes at least one lens 10 and 12 having power in the main scanning direction, and at least one lens 10, 11, and 12 having power in the sub-scanning direction. A position of the lens 10 is adjustable in the optical axis direction, and a position of a whole linear image imaging optical system is collectively adjustable in the optical axis direction.

In the optical scanning device, an imaging position of an optical beam spot is first adjusted in the main scanning direction by adjusting a position of at least one lens (i.e., lens 10), having power in the main scanning direction, in the optical axis direction. Then, the imaging position of the optical beam spot in the sub-scanning direction is adjusted by collectively adjusting a position of the whole linear image imaging optical system in the optical axis direction.

The scanning imaging optical system 600 includes at least one resin imaging element (i.e., lenses 61 and 62). The linear image imaging optical system 100 includes at least one resin lens (i.e., lenses 10 and 11), and at least one glass lens (i.e., lens 12). A variance of a power of resin imaging elements 61 and 62 that changes due to change in environmental temperature is corrected by the variance of power of resin lenses 10 and 11 that is also made due to the change in environmental temperature.

The power of the lenses 61 and 62 (i.e., scanning imaging optical system 600) varies in both main and sub-scanning directions due to the change in the environmental temperature. The linear image imaging optical system 100 includes three lenses 10, 11 and 12. Resin lens 10 has power at least in the main scanning direction. Resin lens 11 has power only in the sub-scanning direction. Lens 12 is formed of glass. The power of resin lens 10 in the main scanning direction is a negative power. The power of resin lens 11, which has the power only in the sub-scanning direction, is negative power.

The power in the scanning imaging optical system 600 varies in both the main and sub-scanning directions due to change in environmental temperature. Resin lens 10 has power in both main and sub-scanning directions while resin lens 11 has power in the sub-scanning direction. Thus, the variance of the power of the scanning imaging optical system 100 in both main and sub-scanning directions is corrected by the variance of the power of the resin lenses 10 and 11.

In the scanning imaging optical system 600, the power in the sub-scanning direction is larger than the power in the main scanning direction. Thus, in the scanning imaging optical system 600, the variance of the power caused by change in environmental temperature is comparatively large in the sub-scanning direction. Hence, the resin lenses in the linear image imaging optical system 100 need to be configured such that the variance of the power is also comparatively large in the sub-scanning direction.

In the above-described example of the present invention, both resin lenses 10 and 11 have negative power in the sub-scanning direction. In addition, because there are three surfaces that have negative power in the sub-scanning direction (i.e., 10b, 11a, and 11b), a necessary negative power is obtained without increasing a curvature of an individual lens surface (i.e., decreasing a radius of curvature) by dispersing the negative power to these lens surfaces. Manufacturing of the lens surface is easily performed and a high degree of accuracy is not required for setting an imaging position in the sub-scanning direction because the radius of curvature of the lens surface is not extremely decreased.

Glass lens 12 has positive power in both main and sub-scanning directions. The positive power in the sub-scanning direction is larger than that in the main scanning direction. Light flux incident from light source 1 side is coupled so as to be a parallel light flux. The linear image imaging optical system 100 is configured to be approximately an afocal system in the main scanning direction when an imaging position of an optical beam spot in the main scanning direction is adjusted.

The linear image imaging optical system 100 in the above-described optical scanning device includes at least one lens 10 and 12 having power in the main scanning direction, and at least one lens 10, 11, and 12 having power in the sub-scanning direction. A position of the lens 10 having power in the main scanning direction is adjustable in the optical axis direction, thereby enabling adjustment of the position of the whole linear image imaging optical system in the optical axis direction.

The linear image imaging optical system includes one or more resin lenses 10 and 11, and one or more glass lens 12. A variance of power of the resin lenses 61 and 62 caused by change in environmental temperature is corrected by a variance of power of resin lenses 10 and 11 caused by the change in environmental temperature. The linear image imaging optical system 100 includes three lenses 10, 11, and 12. Resin lens 10 has power at least in the main scanning direction. Resin lens 11 has power only in the sub-scanning direction. Lens 12 is formed of glass. The power of resin lens 10 in the main scanning direction is a negative power. The power of resin lens 11 in the sub-scanning direction is the negative power.

Glass lens 12 has positive power in both main and sub-scanning directions. The positive power in the sub-scanning direction is larger than that in the main scanning direction.

In the above-described example of the present invention, resin lens 10 has negative power in both the main and sub-scanning directions. Thus, when an imaging position of an optical beam spot is adjusted in the main scanning direction while adjusting the position of resin lens 10 in the optical axis direction, the imaging position of the optical beam spot shifts in the sub-scanning direction due to the power of the resin lens 10 in the sub-scanning direction. To prevent an occurrence of the above-described phenomenon, a lens to be moved in the main scanning direction for adjusting the imaging position of the optical beam spot (i.e., resin lens 10 in this example) is formed to have power only in the main scanning direction.

However, with this arrangement, the number of lens surfaces of the resin lens in the linear image imaging optical system is decreased. The lens surface of the resin lens shares the negative power to correct the variance of the negative power in the scanning imaging optical system caused by environmental temperature change. Thus, the radius of curvature of these lens surfaces is decreased, requiring a higher degree of accuracy for manufacturing and assembling.

In this case, the negative power of the lens (which has negative power in the main scanning direction and is moved to adjust an imaging position of an optical beam spot in the main scanning direction) in the sub-scanning direction is made smaller than the negative power of the lens (i.e., resin lens 11 in this example) which has the negative power only in the sub-scanning direction in the linear image imaging optical system. Thus, the shift of the imaging position of the optical beam spot in the sub-scanning direction caused when adjusting the position of the optical spot in the main scanning direction is minimized. Hence, an amount of adjustment of the imaging position of the optical beam spot in the sub-scanning direction is decreased.

Figure 4:
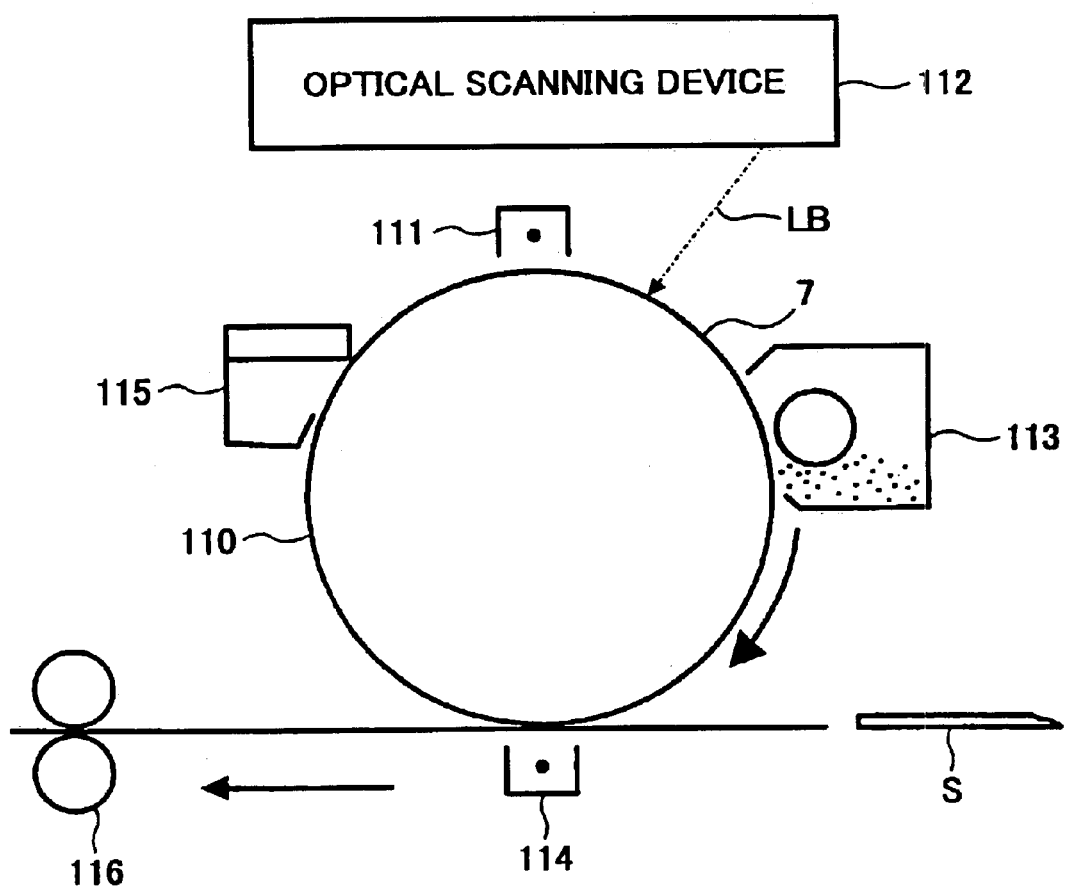
FIG. 4 is a drawing illustrating a construction of an image forming apparatus as an example of application of the present invention.

FIG. 4 is a schematic drawing illustrating an exemplary construction of an image forming apparatus. The image forming apparatus is a laser printer. The laser printer includes a cylindrically formed photoconductive element as a photoconductive medium 110. Around the photoconductive medium 110, a charging device 111 (such as a corona charger or contacting discharging roller, for example), a developing device 113, a transfer device 114 (such as a corona discharge or a contacting transfer roller, for example), and a cleaning device 115 are arranged. Reference numeral 116 and S represent a fixing device and transfer sheet as a sheet-like recording medium, respectively.

An optical scanning device 112 emitting laser beam flux LB exposes a surface of the photoconductive medium 110 between the charging device 111 and developing device 113. When an image is formed, photoconductive medium 110 (which is a photoconductive element) rotates at a constant speed in a clockwise direction. Charging device 111 uniformly charges a surface of the photoconductive medium 110. Optical scanning device 112 exposes the surface of photoconductive medium 110 with laser beam flux LB to form an electrostatic latent image thereon.

The electrostatic latent image is a negative latent image. This electrostatic latent image is reversely developed by developing device 113. Thus, a toner image is formed on the surface of photoconductive medium 110. Transfer sheet S is conveyed to a transfer section by adjusting the conveying timing to correspond to the timing that the toner image on the surface of photoconductive medium 110 reaches the transfer section so that the transfer sheet S is in precise register with the toner image. The toner image is then transferred onto transfer sheet S by transfer device 114.

Transfer sheet S having the toner image thereon is conveyed to fixing device 116, where the toner image is fixed onto transfer sheet S. Transfer sheet S is then discharged. After the toner image has been transferred onto transfer sheet S, cleaning device 115 cleans the surface of photoconductive medium 110 and removes residual toner and paper lint remaining on the surface of photoconductive medium 110.

An overhead transparency film sheet may be used instead of transfer sheet S. The toner image transfer operation may be performed via an intermediate transfer medium such as an intermediate transfer belt.

If the optical scanning device according to the present invention is employed as optical scanning device 112, high quality images are formed.

An example of the optical scanning device according to the present invention is described below. A shape of lens surface is specified in the following description. a shape of a lens surface X (Y, Z) is described below.

$$X(Y,Z) = CmY^2/[1+SQRT\{1-(1+K)Cm^2Y^2\}] + A_1Y + A_2Y^2 + A_3Y^3 + \ldots + Cs(Y)Z^2/[1+SQRT(1-(1+Kz(Y))Cs(Y)^2Z^2)] + f\,sag(Y,Z) \quad (1)$$

in which:
Coordinates in the axis direction are denoted as "X".
Coordinates in the main scanning direction (i.e., distance from X-axis) are denoted as "Y".
Coordinates in the sub-scanning direction (i.e., distance from X-axis) are denoted as "Z".
SQRT denotes the square root.
"f sag(Y,Z)" denotes a function of Y and Z that is defined below.

The above-described "cross section in the sub-scanning direction" exists in each coordinate in the main scanning direction Y.

A portion of the right-hand side of expression (1), namely:

$$CmY^2/[1+SQRT\{1-(1+K)Cm^2Y^2\}] + A_1Y + A_2Y^2 + A_3Y^3 + \ldots$$

shows a shape of a lens surface in the main scanning cross section:
Cm represents a paraxial curvature (i.e., reciprocal of paraxial radius of curvature Rm, i.e., Cm=1/Rm) in the main scanning cross section in the vicinity of the axial position (i.e., X=0).
K represents a cone constant.
A1, A2, . . . are coefficients.
Another portion of expression (1), namely:

$$Cs(Y)Z^2/[1+SQRT(1-(1+Kz(Y))Cs(Y)^2Z^2)] + f\,sag(Y,Z)$$

shows the shape of the lens in the sub-scanning cross section in the coordinate Y:
Cs(Y) represents a paraxial curvature (i.e., reciprocal of paraxial radius of curvature Rs(Y), i.e., Cs(Y)=1/Rs(Y)) in the vicinity of the position where Z=0 (i.e., at a position in the main scanning cross section) in the sub-scanning cross section in the coordinate Y. Cs(Y) is expressed as a function of Y:

$$Cs(Y) = 1/Rs(0) + B_1Y + B_2Y^2 + B_3Y^3 + B_4Y^4 + B_5Y^5 + \ldots$$

Kz(Y) is the cone constant of a lens surface in the sub-scanning cross section in the coordinate Y. Kz(Y) is indicated as a function of Y:

$$Kz(Y) = C_0 + C_1Y + C_2Y^2 + C_3Y^3 + C_4Y^4 + C_5Y^5 \ldots$$

f sag(Y,Z)" is expressed by the expansion:

$$f\,sag(Y,Z) = (F_0 + F_1Y + F_2Y^2 + F_3Y^3 + F_4Y^4 + \ldots)Z$$
$$+ (G_0 + G_1Y + G_2Y^2 + G_3Y^3 + G_4Y^4 + \ldots)Z^2$$
$$+ (H_0 + H_1Y + H_2Y^2 + H_3Y^3 + H_4Y^4 + \ldots)Z^3$$
$$+ (I_0 + I_1Y + I_2Y^2 + I_3Y^3 + I_4Y^4 + \ldots)Z^4$$
$$+ (J_0 + J_1Y + J_2Y^2 + J_3Y^3 + J_4Y^4 + \ldots)Z^5$$
$$+ (K_0 + K_1Y + K_2Y^2 + K_3Y^3 + K_4Y_4 + \ldots)Z^6 + \ldots$$

A non-arc lens shape surface in the sub-scanning cross section indicates the shape of lens surface that satisfies the requirement that at least one of "f sag (Y, Z)" and "Kz(Y)" in expression (1) is not equal to zero.

In an illustrative example to which the scope of the invention should not be limited, the elements have the following characteristics:
Light source: semiconductor laser of wavelength 780 nm.
Coupling lens: single lens, focal length: 27 mm.
Coupling effect: collimating effect
Optical deflector: rotatable polygon mirror
Number of deflecting surfaces: 5
Inscribed circle radius: 18 mm
Angle formed between light flux emitted from the light source and optical axis in scanning imaging optical system: 60 degrees
Effective scanning width: ±161.5 mm
Angle of field: ±40.6 degrees As illustrated in FIG. 1B, thicknesses of each lens and distances between each lens on the optical path from the emerging surface of the coupling lens 2 to the scanned surface 7 are denoted d1 through d11. The lens surfaces in the linear image imaging optical system are denoted 10a, 10b, 11a, 11b, 12a, 12b as described above. Lens surfaces of lenses 61 and 62 are denoted 61a, 61b, 62a, and 62b as illustrated in FIG. 1B. In one implementation of FIG. 1B:
d1=3 mm,
d2=9.2 mm,
d3=3 mm,
d4=8.15 mm,
d5=6 mm, and
d6=114 mm.

Data on a radius of curvature of each lens in the linear image imaging optical system is described below. With regard to a lens having a non-arc shape, data on a paraxial radius of curvature is provided.

Radius of Curvature

10$a$: −119.97 mm (spherical surface).

10$b$ in the main scanning direction: ∞, in the sub-scanning direction: 16.4 mm (cylindrical surface having a concave shape).

11$a$ in the main scanning direction: ∞, in the sub-scanning direction: −16 mm (cylindrical surface having a concave shape).

11$b$ in the main scanning direction: ∞, in the sub-scanning direction: 18.03 mm (cylindrical surface having a concave shape).

12$a$ in the main scanning direction: 1.0E+8, in the sub-scanning direction: 13.54 mm (non-arc shape lens surface in the sub-scanning cross section).

12$b$: −186 mm (i.e., spherical surface).

12$a$: non-arc shape lens surface in the sub-scanning cross section.

Related Parameters
Rm=1.00+0.8,
Rs(0)=13.54,
$A_4$=−1.167576E−0.7,
$A_6$=1.236756E−11,
$C_0$=−8.413895E−01,
$C_2$=−7.014231E−04,
$C_4$=7.664337E−05,
$C_6$=7.406181E−06,
$C_8$=−8.915899E−0.8,
$I_0$=−5.984409E−05,
$I_2$=−9.295456E−08,
$I_4$=−1.267730E−08,
$I_6$=1.645283E−10,
$I_8$=−5.745329E−12,
$K_0$=1.108638E−07,
$K_2$=1.241363E−08,
$K_4$=−9.523815E−11,
$K_8$=6.477626E−14.

(In the above list, for example, "E+8" and "E−05" indicate "$10^8$" and "$10^{-5}$", respectively. These numerical values are multiplied by the numerical values positioned immediately before these numerical values.)

Refractive index of material of resin lenses 10, 11: 1.523978 (i.e., λ=780 nm at 25° C.).

Linear expansion coefficient of resin lenses 10 and 11: $7 \times 10^{-5}$.

Refractive index of material of glass lens 12: 1.733278 (i.e., λ=780 nm at 25° C.).

Linear expansion coefficient of glass lens 12: $5.4 \times 10^{-6}$.

Linear expansion coefficient of lens holding portion (i.e., substrate member, and first and second holders): $2.31 \times 10^{-5}$.

d7=71.6 mm.
d8=30 mm.
d9=66.3 mm.
d10=8.5 mm.
d11=159.3 mm.

Shift amounts of d12 and d13 (FIG. 1A) in the main scanning direction are provided to lenses 61 and 62 to reduce a "sag effect" caused at a reflection position of the deflector 5. To explain the sag effect, it is recognized that, when a rotating polygon mirror is used as a light deflecting device, its rotational center deviates from the optical axis of the scanning optical system, and thus when the reflecting point of the deflecting surface changes, the deflecting point of the light flux also varies so as to cause optical sag constituting "sag effect." Values of the shift amounts of d12 and d13 are provided below. The shift amount in the upper direction in FIG. 1A is referred to as a positive shift amount:

d12=0.2 mm.
d13=0.2 mm.

Refractive index of material of resin lenses 61 and 62: 1.523978 (i.e., λ=780 nm at 25).

Linear expansion coefficient of resin lenses 61 and 62: $7 \times 10^{-5}$.

A shape of lens surface 61$a$ (i.e., a shape in the main scanning cross section) is a non-arc, and a curvature in the sub-scanning cross section asymmetrically changes with respect to the optical axis based on the expression:

$$Cs(Y)=1/Rs(0)+B_1 Y+B_2 Y^2+B_3 Y^3+B_4 Y^4+B_5 Y^5+ \ldots$$

in which:
Rm=−1030.233346,
Rs(0)=−89.518927,
$A_0$=−4.041619E+02,
$A_4$6.005017E−08,
$A_6$=−7.538155E−13,
$A_8$=−4.036824E−16,
$A_{10}$=4.592164E−20,
$A_{12}$=−2.396524E−24,
$B_1$=−9.317851E−06,
$B_2$=3.269905E−06,
$B_3$=4.132497E−09,
$B_4$=−4.207716E−10,
$B_5$=−1.170114E−12,
$B_6$=4.370640E−14,
$B_7$=2.347965E−16,
$B_8$=−6.212795E−18,
$B_9$=−3.967994E−20,
$B_{10}$=−3.873869E−21,
$B_{11}$=3.816823E−24,
$B_{12}$=4.535843E−25.

A shape of lens surface 61$b$ (i.e., a shape in the main scanning cross section) is a non-arc, and a curvature in the sub-scanning cross section asymmetrically changes with respect to the optical axis based on the same expression as given above for surface 61$a$, but in which the values take on the following values:

Rm=−109.082474,
Rs(0)=−110.881332,
$A_0$=−5.427642E−01,
$A_4$=9.539024E−08,
$A_6$=4.882194E−13,
$A_8$=−1.198993E−16,
$A_{10}$=5.029989E−20,
$A_{12}$=−5.654269E−24,
$B_2$=−3.652575E−07,
$B_4$=2.336762E−11,
$B_6$=8.426224E−14,
$B_8$=−1.026127E−17,
$B_{10}$=−2.202344E−21,
$B_{12}$=1.224555E−26.

A shape of lens surface 62$a$ (i.e., a shape in the main scanning cross section) is a non-arc, and a curvature in the sub-scanning cross section asymmetrically changes with respect to the optical axis based on the same expression as given above for surface 61$a$, but in which the values take on the following values:

Rm=1493.654587,
Rs(0)=−70.072432,
$A_0$=5.479389E+01,
$A_4$=−7.606757E−09,
$A_6$=−6.311203E−13,
$A_8$=6.133813E−17, $A_{10}=-1.482144E-21$,
$A_{12}=2.429275E-26$,
$A_{14}=-1.688771E-30$,
$B_2=-8.701573E-08$,
$B_4=2.829315E-11$,
$B_6=-1.930080E-15$,
$B_8=2.766862E-20$,
$B_{10}=2.176995E-24$,
$B_{12}=-6.107799E-29$.

A shape of the lens surface 62b (i.e., non-arc lens shape surface in the sub-scanning cross section) is governed based on the same expression as given above for surface 61a, but in which the values take on the following values:
Rm=1748.583900,
Rs(0)=−28.034612,
$A_0=-5.488740E+02$,
$A_4=-4.978348E-08$,
$A_6=2.325104E-12$,
$A_8=-7.619465E-17$,
$A_{10}=3.322730E-21$,
$A_{12}=-3.571328E-26$,
$A_{14}=-2.198782E-30$,
$B_1=-1.440188E-06$,
$B_2=4.696142E-07$,
$B_3=1.853999E-11$,
$B_4=-4.153092E-11$,
$B_5=-8.494278E-16$,
$B_6=2.193172E-15$,
$B_7=9.003631E-19$,
$B_8=-9.271637E-21$,
$B_9=-1.328111E-22$,
$B_{10}=-1.409647E-24$,
$B_{11}=5.520183E-27$,
$B_{12}=4.513104E-30$,
$C_0=-9.999999E-01$,
$I_0=-1.320849E-07$,
$I_2=-1.087674E-11$,
$I_4=-9.022577E-16$,
$I_6=-7.344134E-20$,
$K_0=9.396622E-09$,
$K_2=1.148840E-12$,
$K_4=8.063518E-17$,
$K_6=-1.473844E-20$.

Figure 3A:
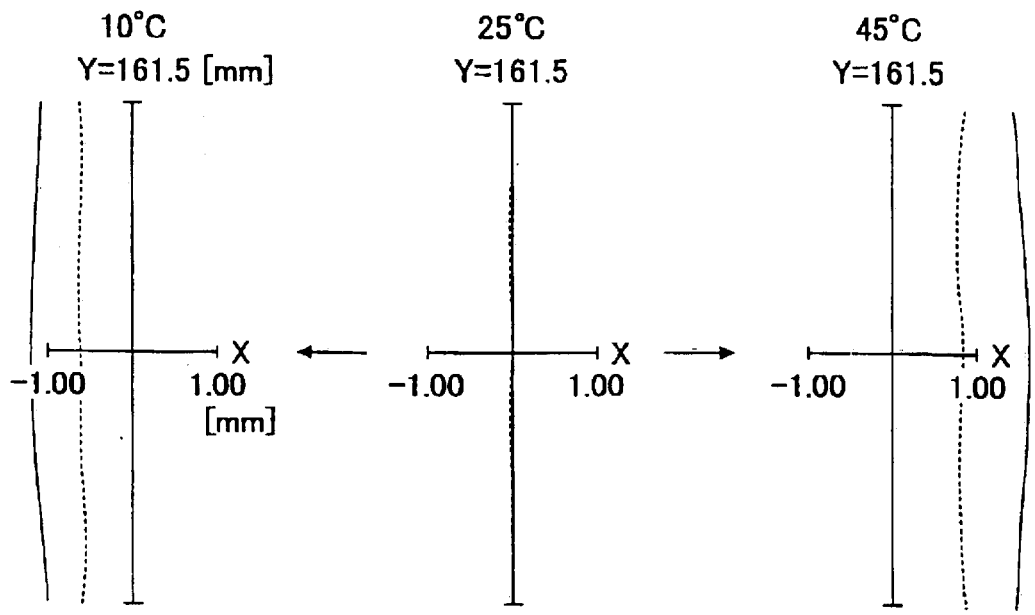
FIGS. 3A and 3B illustrate an effect of the exemplary linear image imaging optical system 100.

FIG. 3A illustrates a change in a curvature of field in the main and sub-scanning direction at environmental temperatures 10° C., 25° C., and 45° C. when a glass cylindrical lens having a focal length of 45 mm (which is equivalent to the linear image imaging optical system in the above-described example) is employed, instead of the inventive linear image imaging optical system 100 in the above-described example. At an environmental temperature of 45° C., in a system with a designed temperature is 25° C., an imaging position of an optical beam spot is shifted by 1 mm and 1.5 mm in the main and sub-scanning directions, respectively. The shifted amount of the imaging position of the optical beam spot in the main scanning direction differs from that in the sub-scanning direction.

Figure 3B:
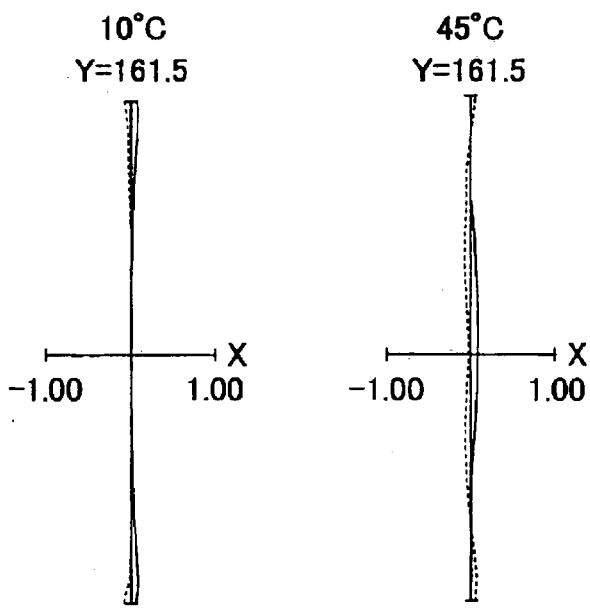

FIG. 3B is a drawing illustrating a change in a curvature of field caused by a change in environmental temperature in the above-described example. The curvature of field at the designed temperature is identical to that illustrated in the center in FIG. 3A. The shifted amount of the imaging position of the optical beam spot in both the main and sub-scanning directions is decreased within 0.1 mm over the environmental temperature range from 10° C. to 45° C.

In the above-described example, one or more lens surfaces (i.e., emerging surface of the glass lens 12) in the linear image imaging optical system 100 include a non-arc shape in the sub-scanning cross section. As illustrated in FIGS. 2A and 2B, glass lens 12 is a lens in which a diameter of a transmitted light flux in the sub-scanning direction becomes maximum. Glass lens 12 having the non-arc shape in the sub-scanning cross section is provided at a position that is the closest to optical deflector 5 in the linear image imaging optical system.

As described above, an imaging position of an optical beam spot is adjusted in the following manner. The imaging position of the optical beam spot in the main scanning direction is adjusted by moving a position of resin lens 10 along the optical axis direction. Then, a position of the whole linear image imaging optical system 100 is collectively moved along the optical axis direction to adjust the imaging position of the optical beam spot in the sub-scanning direction.

The imaging position of the optical beam spot may also be adjusted in the following manner. The imaging position of the optical beam spot in the main scanning direction is adjusted by moving the resin lens 10 along the optical axis direction. Then, the imaging position of the optical beam spot in the sub-scanning direction is adjusted by moving resin lens 11, which has no power in the main scanning direction, along the optical axis direction.

However, the adjustment may not be easily made in this manner. If the adjustment is made in the above-described manners, a shifted amount of the imaging position of the optical beam spot is described below in both the main and sub-scanning directions, when the position of the resin lens 10 is moved by 0.1 mm toward the optical axis direction, and when the position of the whole linear image imaging optical system 100 is collectively moved by 0.1 mm toward the optical axis direction.

Shifted amount of lens:
Resin lens 10: 0.1 mm
Whole system: 0.1 mm
Shifted amount of imaging position of optical beam spot in main scanning direction:
Resin lens 10: 0.08 mm
Whole system: 0 mm
Shifted amount of imaging position of optical beam spot in sub-scanning direction:
Resin lens 10: 0.23 mm
Whole system: 0.08 mm To the contrary, if the position of the resin lens 11 is moved by 0.1 mm toward the optical axis direction, the shifted amount of the imaging position of the optical beam spot is described below in both the main and sub-scanning directions.

Shifted amount of lens:
Resin lens 11: 0.1 mm
Shifted amount of imaging position of optical beam spot in main scanning direction:
Resin lens 11: 0 mm
Shifted amount of imaging position of optical beam spot in sub-scanning direction:
Resin lens 11: 2.49 mm.

As described above, when resin lens 10 is moved by 0.1 mm in the optical axis direction, the imaging position of the optical beam spot in the main and sub-scanning directions is shifted by 0.08 mm and 0.23 mm, respectively. Namely, the imaging position of the optical beam spot in the main and sub-scanning directions is moved by 0.8 times and 2.3 times, respectively, of the amount of movement of resin lens 10.

To the contrary, the imaging position of the optical beam spot in the sub-scanning directions is moved by 2.49 mm, namely, 24.9 times the amount of movement of the resin lens 11 of 0.1 mm though the imaging position of the optical beam spot in the main scanning direction is unchanged.

The above fact means that a high degree of accuracy is required for setting the position of resin lens 11 when adjusting the imaging position of the optical beam spot in the sub-scanning direction by moving the position of the resin lens 11 toward the optical axis direction.

According to the example of the present invention, the imaging position of the optical beam spot in the sub-scanning direction is adjusted by collectively moving the entire linear image imaging optical system 100 toward the optical axis direction. Thus, the imaging position of the optical beam spot in the sub-scanning direction is moved by 0.8 times the amount of movement of the whole linear image imaging optical system though the imaging position of the optical beam spot in the main scanning direction is unchanged. Therefore, the degree of accuracy required for setting the position is decreased to approximately $1/30$ of that in when the position of the resin lens 11 is moved.

Numerous additional modifications and variations of the present invention are possible in light of the above teachings. It is therefore to be understood that within the scope of the appended claims and their equivalents, the present invention may be practiced otherwise than as specifically described herein.

This document claims priority and contains subject matter related to Japanese Patent Application No. 2001-169357, filed on Jun. 5, 2001, and the entire contents thereof are herein incorporated by reference.

What is claimed as new and is desired to be secured by LETTERS PATENT of the UNITED STATES is:

1. A method of adjusting an imaging position of an optical beam spot in both a main scanning direction and a sub-scanning direction in an optical scanning device in which light flux from a light source side is formed into a long linear image in the main scanning direction using a linear image imaging optical system, the linear image being deflected by an optical deflector having a deflecting surface near where the linear image is formed, and in which the linear image is condensed toward a scanned surface using a scanning imaging optical system to form the optical beam spot on the scanned surface, the method comprising:

providing, in the linear image imaging optical system, at least one lens having a power in the main scanning direction and at least one lens having the power in the sub-scanning direction;

firstly adjusting the imaging position of the optical beam spot in the main scanning direction, by adjusting a position of the at least one lens having the power in the main scanning direction in an optical axis direction; and secondly adjusting the imaging position of the optical beam spot in the sub-scanning direction by collectively adjusting a position of the linear image imaging optical system as a whole, in the optical axis direction.

2. An optical scanning device, comprising:

a) a linear image imaging optical system configured to receive light flux incident from a light source side and to form a long linear image in a main scanning direction, the linear image imaging optical system including:
 1) at least one lens having a power in the main scanning direction; and
 2) at least one lens having the power in a sub-scanning direction;

b) an optical deflector configured to deflect the linear image, the optical deflector including a deflecting surface in the vicinity of a position where the long linear image is formed; and c) a scanning imaging optical system configured to condense the long linear image toward a scanned surface to form an optical beam spot on the scanned surface;

wherein a position of the at least one lens having the power in the main scanning direction is individually adjustable in an optical axis direction; and wherein a position of the linear image imaging optical system as a whole is collectively adjustable in the optical axis direction.

3. The device of claim 2, wherein:

the scanning imaging optical system includes at least one resin imaging element;

the lenses of the linear image imaging optical system include at least one resin lens and at least one glass lens; and a variance of a power of the at least one resin imaging element in the scanning imaging optical system caused by a change in an environmental temperature is corrected by a variance of a power of the at least one resin lens in the linear image imaging optical system caused by the change in the environmental temperature.

4. The device of claim 3, wherein:

the power of the at least one resin imaging element in the scanning imaging optical system varies in both the main and sub-scanning directions due to the change in the environmental temperature, and the linear image imaging optical system includes:
 1) the resin lens having the power at least in the main scanning direction;
 2) the resin lens having the power only in the sub-scanning direction; and
 3) a glass lens.

5. The device of claim 4, wherein:

the resin lens that has the power at least in the main scanning direction in the linear image imaging optical system has a negative power in the main scanning direction; and the resin lens that has the power only in the sub-scanning direction in the linear image imaging optical system has the negative power.

6. The device of claim 5, wherein:

the negative power in the sub-scanning direction of the resin lens that has the power at least in the main scanning direction in the linear image imaging optical system is smaller than the negative power of the resin lens that has the power only in the sub-scanning direction in the linear image imaging optical system.

7. The device of claim 5, wherein:

the glass lens in the linear image imaging optical system has a positive power in both the main and sub-scanning directions; and the positive power in the sub-scanning direction is larger than the positive power in the main scanning direction.

8. The device of claim 2, wherein:

at least one lens surface in the linear image imaging optical system include a non-arc shape in a sub-scanning cross section.

9. The device of claim 8, wherein:

the non-arc shape is adopted in a lens in which a diameter of a transmitted light flux in the sub-scanning direction becomes maximum.

10. The device of claim 2, wherein:

light flux incident from the light source is converted to a parallel light flux; and the linear image imaging optical system becomes approximately an afocal system in the main scanning direction when an imaging position of an optical beam spot in the main scanning direction is adjusted.

11. A linear image imaging optical system for use in the device of claim 2, wherein:

the position of the at least one lens having the power in the main scanning direction is adjustable in the optical axis direction, and the position of the linear image imaging optical system as a whole is collectively adjustable in the optical axis direction.

12. A linear image imaging optical system for use in the device of claim 3, comprising:

the at least one resin lens and the at least one glass lens;

wherein a variance of the power of the resin imaging elements in the scanning imaging optical system caused by the change in the environmental temperature is corrected by a variance of the power of the resin lenses in the linear image imaging optical system caused by the change in the environmental temperature.

13. The system of claim 12, comprising:

the resin lens having the power at least in the main scanning direction;

the resin lens having the power only in the sub-scanning direction; and a glass lens.

14. The system of claim 13, wherein:

the resin lens that has the power at least in the main scanning direction has a negative power in the main scanning direction; and the resin lens that has the power only in the sub-scanning direction has the negative power.

15. The system of claim 14, wherein:

the negative power in the sub-scanning direction of the resin lens that has the power at least in the main scanning direction is smaller than the negative power of the resin lens that has the power only in the sub-scanning direction.

16. The system of claim 14, wherein:

the glass lens has a positive power in both the main and sub-scanning directions; and the positive power in the sub-scanning direction is larger than the positive power in the main scanning direction.

17. The system of claim 16, wherein:

the system is configured to be installed in the device so that the glass lens is provided at a position that is closest to the optical deflector; and a surface of the glass lens on a side of the scanned surface includes a non-arc shape in a sub-scanning cross section.

18. An image forming apparatus, comprising:

a) a casing;

b) a photoconductive medium as a scanned surface; and c) an optical scanning device, including:

1) a linear image imaging optical system configured to form a coupled light flux incident from a light source side into a long linear image in a main scanning direction, the linear image imaging optical system being comprised of a plurality of lenses including at least one lens having a power in the main scanning direction and at least one lens having the power in a sub-scanning direction;

2) an optical deflector configured to deflect the linear image, the optical deflector including a deflecting surface in the vicinity of a position where the linear image is formed; and 3) a scanning imaging optical system configured to condense the linear image toward the scanned surface to form an optical beam spot on the scanned surface;

wherein a position of the at least one lens having the power in the main scanning direction in the linear image imaging optical system is individually adjustable in an optical axis direction; and wherein a position of the linear image imaging optical system as a whole is collectively adjustable in the optical axis direction.

19. The apparatus of claim 18, wherein:

a latent image is formed on a surface of the photoconductive medium by optically scanning the surface of the photoconductive medium; and the latent image is developed into a visible image.

20. The apparatus of claim 19, wherein:

the photoconductive medium includes a photoconductive element having a surface of which an electrostatic latent image is formed; and the electrostatic latent image is developed into a toner image such that the toner image is borne by a sheet-like recording medium.

21. An optical scanning device, comprising:

a) means for forming incident light flux from a light source side into a long linear image in a main scanning direction, the means for forming including:

1) at least one lens having a power in the main scanning direction; and 2) at least one lens having the power in a sub-scanning direction;

b) means for deflecting the linear image, the means for deflecting including a deflecting surface near where the linear image is formed; and c) means for condensing the linear image toward a scanned surface to form an optical beam spot on the scanned surface;

wherein a position of the at least one lens having the power in the main scanning direction in the means for forming is individually adjustable in an optical axis direction; and wherein a position of a means for forming as a whole, is collectively adjustable in the optical axis direction.

* * * * *